United States Patent
Hotta et al.

(10) Patent No.: US 10,250,471 B2
(45) Date of Patent: Apr. 2, 2019

(54) APPARATUS AND METHOD FOR COLLECTING AND ANALYZING LOGS TO OBTAIN INFORMATION ABOUT PROGRAM COMPONENTS USED BY APPLICATIONS

(71) Applicant: FUJITSU LIMITED, Kawasaki-shi, Kanagawa (JP)

(72) Inventors: Yuuji Hotta, Kawasaki (JP); Takeshi Yasuie, Kawasaki (JP); Toshihiro Shimizu, Sagamihara (JP); Atsuji Sekiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 15/235,137

(22) Filed: Aug. 12, 2016

(65) Prior Publication Data

US 2017/0093662 A1    Mar. 30, 2017

(30) Foreign Application Priority Data

Sep. 30, 2015  (JP) ................................ 2015-193728

(51) Int. Cl.
 *G06F 15/16* (2006.01)
 *H04L 12/26* (2006.01)
 (Continued)

(52) U.S. Cl.
 CPC ........ *H04L 43/08* (2013.01); *G06F 17/30979* (2013.01); *G06F 21/563* (2013.01); *H04L 41/069* (2013.01); *H04L 67/10* (2013.01)

(58) Field of Classification Search
 CPC ....... H04L 43/08; H04L 41/069; H04L 67/10; G06F 17/30979; G06F 21/563
 See application file for complete search history.

(56) References Cited

U.S. PATENT DOCUMENTS 5,758,062 A * 5/1998 McMahon .......... G06F 11/3688
                                                    714/33
7,219,125 B1 * 5/2007 Day ...................... G06F 9/5055
                                                    709/203

(Continued)

FOREIGN PATENT DOCUMENTS

JP          2007-241426         9/2007
JP          2013-92977          5/2013
              (Continued)

*Primary Examiner* — Michael Won
(74) *Attorney, Agent, or Firm* — Fujitsu Patent Center

(57) ABSTRACT

An analysis apparatus compares first code describing a plurality of first components with second code describing a plurality of second components, to extract difference components. The analysis apparatus sends a plurality of requests to an execution apparatus on which the plurality of second components are deployed, obtains first log information indicating the execution state of each difference component, and specifies relevant requests related to the execution of the difference components. The analysis apparatus sends the specified relevant requests to the execution apparatus and obtains second log information indicating the execution state of each of the plurality of second components. The analysis apparatus generates path information about second components executed in response to each relevant request among the plurality of second components, on the basis of the second log information.

6 Claims, 13 Drawing Sheets

(51) Int. Cl.
*G06F 17/30* (2006.01)
*H04L 12/24* (2006.01)
*H04L 29/08* (2006.01)
*G06F 21/56* (2013.01)

(56) References Cited

U.S. PATENT DOCUMENTS

| | | | | |
|---|---|---|---|---|
| 7,363,622 B2* | 4/2008 | Owada | | G06F 8/658 |
| | | | | 717/168 |
| 7,463,648 B1* | 12/2008 | Eppstein | | G06F 9/5011 |
| | | | | 370/468 |
| 8,365,147 B2* | 1/2013 | Grechanik | | G06F 8/70 |
| | | | | 714/37 |
| 9,298,909 B2* | 3/2016 | Du | | G06F 21/81 |
| 10,027,692 B2* | 7/2018 | Hay | | H04L 63/1416 |
| 10,146,666 B1* | 12/2018 | Beales | | G06F 11/3664 |
| 2004/0221270 A1* | 11/2004 | Witchel | | G06F 8/71 |
| | | | | 717/124 |
| 2005/0262483 A1* | 11/2005 | Laird | | G06F 8/65 |
| | | | | 717/120 |
| 2007/0073785 A1* | 3/2007 | Laird | | G06F 8/71 |
| 2007/0288553 A1* | 12/2007 | Donaghey | | G01D 4/004 |
| | | | | 709/203 |
| 2007/0294686 A1* | 12/2007 | Oh | | G06F 8/658 |
| | | | | 717/168 |
| 2008/0256393 A1* | 10/2008 | Ur | | G06F 11/3616 |
| | | | | 714/38.1 |
| 2009/0070733 A1* | 3/2009 | Huang | | G06F 11/366 |
| | | | | 717/101 |
| 2009/0313608 A1* | 12/2009 | Sharma | | G06F 8/38 |
| | | | | 717/126 |
| 2011/0047208 A1* | 2/2011 | Kudou | | G06F 11/3409 |
| | | | | 709/203 |
| 2011/0270963 A1* | 11/2011 | Saito | | G06F 21/105 |
| | | | | 709/224 |
| 2012/0117545 A1* | 5/2012 | Yokoi | | G06F 11/3624 |
| | | | | 717/126 |
| 2012/0166623 A1* | 6/2012 | Suit | | G06F 11/3006 |
| | | | | 709/224 |
| 2014/0059249 A1* | 2/2014 | Kashimoto | | G06F 17/2217 |
| | | | | 709/246 |
| 2014/0108557 A1* | 4/2014 | Calman | | G06Q 10/101 |
| | | | | 709/205 |
| 2014/0195856 A1 | 7/2014 | Hotta | | |
| 2015/0039764 A1* | 2/2015 | Beloglazov | | H04L 47/70 |
| | | | | 709/226 |
| 2015/0135018 A1 | 5/2015 | Hotta et al. | | |
| 2018/0026910 A1* | 1/2018 | Balle | | H04L 47/782 |

FOREIGN PATENT DOCUMENTS

| JP | 2014-132421 | 7/2014 |
|---|---|---|
| JP | 2015-95065 | 5/2015 |

* cited by examiner

FIG. 12

610 DISPLAY SCREEN

PRE-UPDATE COMPONENT
CALLER-CALLEE RELATIONSHIP TABLE 611

| FUNCTION<br>(URL + PARAMETER) | COMPONENT | | | | |
|---|---|---|---|---|---|
| | A | B | C | D | E |
| FUNCTION 1 | (B) 1 (C) | 1 (A) (C) | (A) (B) 1 | | |
| FUNCTION 2 | 1 (C) | | (A) 1 | | 1 |

POST-UPDATE COMPONENT
CALLER-CALLEE RELATIONSHIP TABLE 612

| FUNCTION<br>(URL + PARAMETER) | COMPONENT | | | | |
|---|---|---|---|---|---|
| | A | B | C | D | E |
| FUNCTION 1 | (B) 1 (C) | 1 (A) (C) | (A) (B) 1 | | |
| FUNCTION 2 | 1 (C) | | (A) 1 | (E) 1 | 1 (D) |

APPARATUS AND METHOD FOR COLLECTING AND ANALYZING LOGS TO OBTAIN INFORMATION ABOUT PROGRAM COMPONENTS USED BY APPLICATIONS

CROSS-REFERENCE TO RELATED APPLICATION

This application is based upon and claims the benefit of priority of the prior Japanese Patent Application No. 2015-193728, filed on Sep. 30, 2015, the entire contents of which are incorporated herein by reference.

FIELD

The embodiments discussed herein relate to an analysis apparatus and an analysis method.

BACKGROUND

Applications, network services, and others may cause system slowdowns and other problems during operation. If such a problem occurs, a system administrator conducts an analysis to find what has caused a delay or an abnormality. For example, to find what has caused a delay, a large number of monitoring points are set in a program that executes a target application or network service, and a large amount of log is collected at the monitoring points. The administrator detects the times taken for processing between the monitoring points, on the basis of timestamps written to the log collected at the monitoring points, and identifies what has caused the delay. Similarly, for example, the administrator may be able to detect a point that is in an unexpected execution state as an abnormal point, on the basis of the collected log. Note that, to narrow down or identify what has caused a delay or another, it is preferable that a large amount of log be collected at a large number of monitoring points. Therefore, a high execution overhead and network load may be caused in a system under operation.

For example, there is an analysis apparatus that analyzes a program before operation, and when an application receives a request, generates path information indicating components used by the application. The path here is a collection of components that are used by the application in response to the request. In the pre-analysis, the analysis apparatus makes a setting for collecting a detailed log at a large number of monitoring points, sends all request patterns expected for the system or the like, and obtains detailed log information. The analysis apparatus then generates path information on the basis of the obtained detailed log information, for use in detection of a problematic portion of the application in later operation.

Please see, for example, Japanese Laid-open Patent Publication Nos. 2007-241426, 2013-92977, and 2014-132421.

However, it takes a great time to execute a program using all request patterns expected by a system test or the like and collect their detailed log information.

A program to be analyzed may be one generated by partly modifying an existing program. However, it is not easy to detect how much the modification, even if it is a partial modification, has an influence on paths, by conducting an analysis of source code, i.e., a static analysis. With regard to a program in which it is dynamically determined what are called by components, it is not possible to detect a caller-callee relationship between components without actually executing the program. There is a case where a modified component may use an existing component. Therefore, in the analysis of the program, the program is executed using all expected request patterns, and a detailed log is collected. For this reason, even for a program generated by slightly modifying an existing program, it is not easy to reduce the processing time for the analysis.

SUMMARY

According to one aspect, there is provided a non-transitory computer-readable recording medium storing a computer program that causes a computer to perform a procedure including: comparing first code describing a plurality of first components with second code describing a plurality of second components to extract a difference component different from any of the plurality of first components among the plurality of second components, at least part of the plurality of first components being executed in response to each of a plurality of requests received, the second code being generated by modifying the first code; sending the plurality of requests to an execution apparatus on which the plurality of second components are deployed, obtaining first log information indicating an execution state of the difference component, and specifying a relevant request related to an execution of the difference component among the plurality of requests, based on the first log information; and sending the specified relevant request to the execution apparatus, obtaining second log information indicating execution states of the plurality of second components, and generating path information about second components executed in response to the relevant request received among the plurality of second components, based on the second log information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 illustrates an example of a display screen displaying component caller-callee relationship tables.

DESCRIPTION OF EMBODIMENTS

Figure 1:
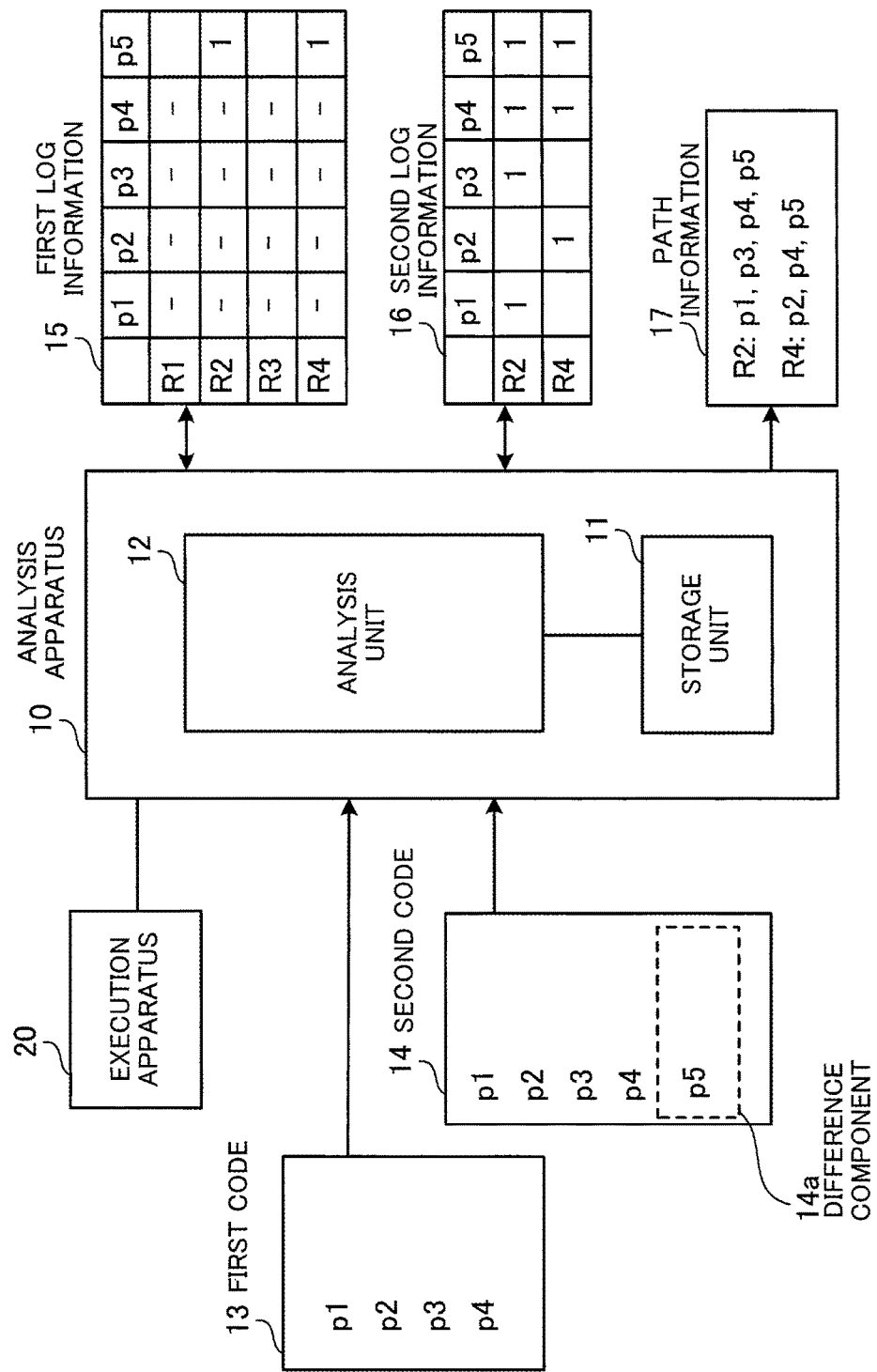
FIG. 1 illustrates an example of an analysis apparatus according to a first embodiment.

Several embodiments will be described below with reference to the accompanying drawings, wherein like reference numerals refer to like elements throughout.

First Embodiment

A first embodiment will be described. FIG. 1 illustrates an example of an analysis apparatus according to the first embodiment.

The analysis apparatus 10 of the first embodiment may be a client computer that is operated by a user or may be a server computer that is accessed from client computers. The analysis apparatus 10 is used to analyze programs. For example, as a pre-analysis, a program is analyzed before the program begins operation. The analysis is performed using first code 13 and second code 14 generated by modifying the first code 13.

The analysis apparatus 10 includes a storage unit 11 and an analysis unit 12, and is connected to an execution apparatus 20. The storage unit 11 may be a volatile storage device, such as a Random Access Memory (RAM), or may be a non-volatile storage device, such as a Hard Disk Drive (HDD) or a flash memory, for example. The analysis unit 12 is a processor, such as a Central Processing Unit (CPU), for example. In this connection, the analysis unit 12 may include an Application Specific Integrated Circuit (ASIC), Field Programmable Gate Array (FPGA), or other application specific electronic circuits. The processor executes programs stored in a memory, such as a RAM. The programs include an analysis program. A set of a plurality of processors (multiprocessor) may be called a "processor". Similarly to the analysis apparatus 10, the execution apparatus 20 includes a storage device and a processor, and the storage device stores therein code describing components. The execution apparatus 20 receives requests and executes components corresponding to the received requests.

The storage unit 11 stores therein the first code 13 and second code 14, received from an external device, first log information 15, second log information 16, and path information 17.

The first code 13 may be application source code or object code, and describes a plurality of first components. For example, the first code 13 may be stored in the execution apparatus 20 as object code. In this case, the execution apparatus 20 executes at least part of the plurality of first components in response to each received request. Referring to the example of FIG. 1, the first components include components p1, p2, p3, and p4. The second code 14 is generated by modifying the first code 13, and describes a plurality of second components. The second code 14 may be stored in the execution apparatus 20 as object code, for example. In this case, the execution apparatus 20 executes at least part of the plurality of second components in response to each received request. Referring to the example of FIG. 1, the second components described in the second code 14 include components p1, p2, p3, p4, and p5. In the following description, putting the execution apparatus 20 into a state where the execution apparatus is able to execute a component in response to a received request is referred to as deploying a component on the execution apparatus 20. In this connection, for example, each component is a part where a method or function is called, a part specified by a user for a log output, or a combination of these parts. In the following description, among the plurality of second components, each second component that is different from any of the plurality of first components is called a difference component 14a.

The first log information 15 indicates the execution state of the difference component 14a, which is part of the plurality of second components. The second log information 16 indicates the execution state of each of the plurality of second components including the difference component 14a. The path information 17 indicates second components that are executed in response to each relevant request related to the execution of the difference component 14a.

The analysis unit 12 reads the first code 13 and the second code 14 from the storage unit 11, and compares the first code 13 with the second code 14 to extract the difference component 14a. Referring to the example of FIG. 1, the analysis unit 12 extracts a component p5 as the difference component 14a.

The analysis unit 12 sends a plurality of requests to the execution apparatus 20 on which the plurality of second components are deployed, and obtains the first log information 15 indicating the execution state of the difference component 14a. At this time, the requests that are sent to the execution apparatus 20 are all requests that have a possibility of calling at least part of the second components, for example. The analysis unit 12 may instruct the execution apparatus 20 to output a log only about the difference component 14a. The analysis unit 12 specifies relevant requests related to the execution of the difference component 14a on the basis of the first log information 15. Referring to the example of FIG. 1, the analysis unit 12 instructs the execution apparatus 20 to monitor only the execution state of the component p5, sequentially sends all requests R1, R2, R3, and R4 to the execution apparatus 20, and collects a log. The first log information 15 contains the collected log in a tabular form. In the first log information 15, "-" indicates that the execution apparatus 20 does not collect a log. A blank indicates that a component has not been executed in response to a request, and "1" indicates that a component has been executed in response to a request. The first log information 15 indicates that a log about the components p1, p2, p3, and p4 is not collected. Also, the first log information 15 indicates that the component p5 has been executed in response to the requests R2 and R4 sent from the analysis unit 12. The analysis unit 12 specifies the requests R2 and R4 as relevant requests related to the difference component 14a, on the basis of the first log information 15.

The analysis unit 12 sends the relevant requests to the execution apparatus 20, and obtains the second log information 16 indicating the execution states of the plurality of second components including the difference component 14a with respect to the relevant requests. At this time, requests to be sent to the execution apparatus 20 are limited to the relevant requests, and any other requests do not need to be sent. The analysis unit 12 may instruct the execution apparatus 20 to output a log about the plurality of second components including the difference component 14a, i.e., all the second components. The analysis unit 12 generates, on the basis of the second log information 16, the path information 17 indicating second components that are executed in response to each relevant request among the plurality of second components. Referring to the example of FIG. 1, the analysis unit 12 instructs the execution apparatus 20 to monitor the components p1, p2, p3, p4, and p5 for collecting their log, sequentially sends the relevant requests R2 and R4 to the execution apparatus 20, and collects the log. The second log information 16 has the same format as the first log information 15. The second log information 16 indicates that the components p1, p3, p4, and p5 have been executed in response to the request R2 sent to the execution apparatus 20. Also, the second log information indicates that the components p2, p4, and p5 have been executed in response to the request R4 sent to the execution apparatus 20. On the basis of this second log information 16, the analysis unit 12 detects the components p1, p3, p4, and p5 as a path with respect to the request R2, and registers them in the path information 17. Likewise, the analysis unit 12 detects the components p2, p4, and p5 as a path with respect to the request R4, and registers them in the path information 17.

As described above, the analysis apparatus 10 of the first embodiment specifies relevant requests related to the execution of the difference component 14a on the basis of the first log information 15 indicating the execution state of the difference component 14a. The analysis apparatus 10 then sends the specified relevant requests to the execution apparatus 20, generates the second log information 16, and generates the path information 17. The generation of the path information needs information about second components that are executed by the execution apparatus 20 in response to the relevant requests. Therefore, in order to generate the second log information 16, the analysis apparatus 10 may send only the relevant requests to the execution apparatus 20. Since requests to be sent to the execution apparatus 20 are limited to the relevant requests, it is possible to reduce the processing time for collecting a log, compared with the case of sending all requests and collecting a log. This approach achieves a reduction in the processing time for analyzing a program.

Second Embodiment

A second embodiment will now be described.

Figure 2:
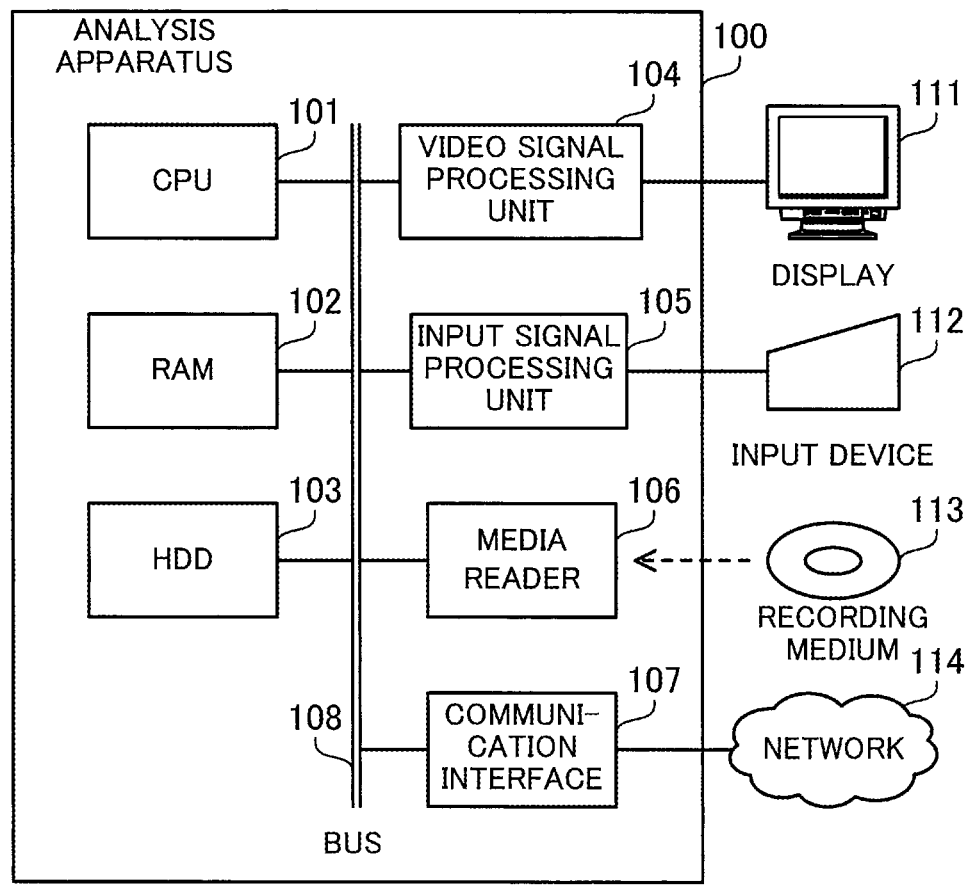
FIG. 2 is a block diagram illustrating an example of a hardware configuration of an analysis apparatus according to a second embodiment.

FIG. 2 is a block diagram illustrating an example of a hardware configuration of an analysis apparatus according to the second embodiment.

An analysis apparatus 100 of the second embodiment supports a pre-analysis of a new program generated by partly modifying an old program before operation. The analysis apparatus 100 includes a CPU 101, a RAM 102, an HDD 103, a video signal processing unit 104, an input signal processing unit 105, a media reader 106, and a communication interface 107. These units are connected to a bus 108.

The CPU 101 is a processor including a computational circuit that executes program instructions. The CPU 101 loads at least part of a program and data from the HDD 103 to the RAM 102 and then executes the program. The CPU 101 may be provided with a plurality of processor cores, and the analysis apparatus 100 may be provided with a plurality of processors. The processes that will be described below may be performed in parallel with a plurality of processors or processor cores.

The RAM 102 is a volatile semiconductor memory for temporarily storing therein a program to be executed by the CPU 101 and data to be used by the CPU 101 in processing. In this connection, the analysis apparatus 100 may be provided with another kind of memory than RAM or a plurality of memories.

The HDD 103 is a non-volatile storage device for storing therein software programs, such as Operating System (OS), middleware, or application software, and data. The programs include an analysis program. In this connection, the analysis apparatus 100 may be provided with another kind of storage device, such as a flash memory or Solid State Drive (SSD), or a plurality of non-volatile storage devices.

The video signal processing unit 104 outputs images to a display 111 connected to the analysis apparatus 100 in accordance with instructions from the CPU 101. As the display 111, a Cathode Ray Tube (CRT) display, a Liquid Crystal Display (LCD), a Plasma Display Panel (PDP), an Organic Electro-Luminescence (OEL) display, or another may be used.

The input signal processing unit 105 obtains an input signal from an input device 112 connected to the analysis apparatus 100 and outputs the input signal to the CPU 101. As the input device 112, a pointing device, such as a mouse, a touch panel, a touch pad, or a track ball, a keyboard, a remote controller, a button switch, or another may be used. In addition, plural kinds of input devices may be connected to the analysis apparatus 100.

The media reader 106 reads programs and data from a recording medium 113. As the recording medium 113, a magnetic disk, such as a Flexible Disk (FD) or HDD, an optical disc, such as a Compact Disc (CD) or Digital Versatile Disc (DVD), a Magneto-Optical (MO) disk, a semiconductor memory, or another may be used. The media reader 106 stores programs and data read from the recording medium 113 in the RAM 102 or HDD 103, for example.

The communication interface 107 is connected to a network 114 to achieve communication with another computer over the network 114. The communication interface 107 may be a wired communication interface, which is connected to a switch or another communication device via a cable, or a wireless communication interface, which is connected to an access point via a wireless link.

In this connection, the analysis apparatus 100 may be configured without the media reader 106. In addition, in the case where the analysis apparatus 100 is accessible to a terminal device operated by a user over the network 114, the analysis apparatus 100 may be configured without the video signal processing unit 104 or the input signal processing unit 105. The display 111 and the input device 112 may be formed integrally with the casing of the analysis apparatus 100. The analysis apparatus 100 corresponds to the analysis apparatus 10 of the first embodiment. The RAM 102 and HDD 103 correspond to the storage unit 11 of the first embodiment. The CPU 101 corresponds to the analysis unit 12 of the first embodiment.

Figure 3:
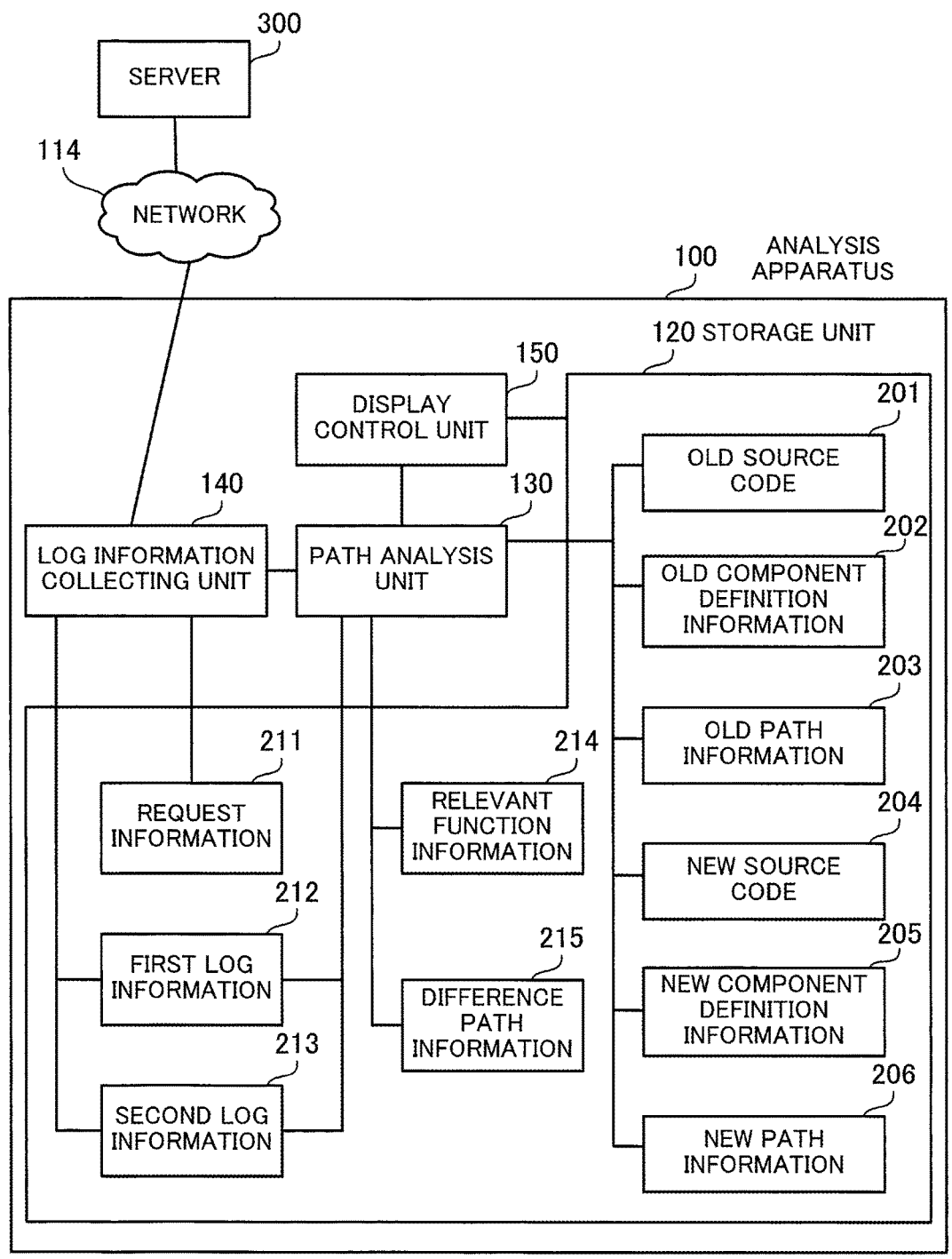
FIG. 3 is a block diagram illustrating an example of functions of the analysis apparatus according to the second embodiment.

FIG. 3 is a block diagram illustrating an example of functions of the analysis apparatus according to the second embodiment.

The analysis apparatus 100 includes a storage unit 120, a path analysis unit 130, a log information collecting unit 140, and a display control unit 150. The storage unit 120 is implemented by using storage space saved in the RAM 102 or HDD 103. The path analysis unit 130, log information collecting unit 140, and display control unit 150 are implemented as program modules that are executed by the CPU 101.

The storage unit 120 stores therein old source code 201, old component definition information 202, old path information 203, new source code 204, new component definition information 205, new path information 206, request information 211, first log information 212, second log information 213, relevant function information 214, and difference path information 215.

The old source code 201 is existing source code. The old source code 201 has been subjected to a pre-analysis, so that its corresponding old component definition information 202 and old path information 203 have been generated. Source code is written in human-readable programming language. The old component definition information 202 defines components included in the old source code 201. The components are obtained by dividing the source code under predetermined rules by the path analysis unit 130. For example, taking methods, classes, if-sentences, and blocks with braces, parts specified by users for a log output, and others as the unit, each component includes one or more units. The old path information 203 is about paths detected by performing the pre-analysis of the old source code 201. A path is a collection of components that are called by a request and executed per request. The second embodiment describes a Web service as a service to be provided. The unit of requests for the Web service is represented by using Uniform Resource Locator (URL)+Common Gateway Interface (CGI)/POST parameter, or others. In the following description, the unit of requests is referred to as a "function".

The new source code 204 is generated by partly updating the old source code 201. Updates include addition, deletion, and modification of components. The new component definition information 205 defines components included in the new source code 204. The path analysis unit 130 processes the new source code 204 to generate the new component definition information 205, in the same way as generating the old component definition information 202.

Request patterns using functions are registered in the request information 211. Each request pattern is associated with functions, for example, so that a request pattern using a certain function may be extracted from the request information 211. For example, the request patterns are created based on a test scenario or collected during operation in advance. The first log information 212 is used for specifying relevant functions related to difference components of the new source code 204 from the old source code 201. The second log information 213 is used for detecting paths for the specified relevant functions related to the difference components. The relevant function information 214 is about functions related to the difference components of the new source code 204. The difference path information 215 is about paths including components of the new source code 204 that are called by the functions registered in the relevant function information 214.

The path analysis unit 130 compares the old source code 201 with the new source code 204 and extracts differences therebetween. In the case where the new source code 204 includes an added portion, the path analysis unit 130 extracts added components included in the added portion. The path analysis unit 130 instructs the log information collecting unit 140 to make a setting for an output of detailed log about the added components and obtain logs with respect to all request patterns, and obtains the first log information 212. The path analysis unit 130 specifies functions related to the added components on the basis of the first log information 212, and registers the functions in the relevant function information 214. In addition, in the case where the new source code 204 includes a deleted portion or a modified portion, the path analysis unit 130 extracts corresponding deleted or modified components on the basis of the old component definition information 202. After that, the path analysis unit 130 specifies functions related to the modified or deleted components on the basis of the old path information 203, and registers them in the relevant function information 214. In this way, functions related to all components (hereinafter, referred to as difference components) that have been added, modified, or deleted by updating the old source code 201 to the new source code 204 are registered in the relevant function information 214. The path analysis unit 130 instructs the log information collecting unit 140 to make a setting for an output of detailed log about all components and collect logs using requests corresponding to the functions registered in the relevant function information 214, and obtains the second log information 213. The path analysis unit 130 detects a path for each function on the basis of the second log information and generates the difference path information 215. Then, the path analysis unit 130 generates the new path information 206 by combining the old path information 203 and the difference path information 215.

The log information collecting unit 140 connects to a server 300 which executes a target application over the network 114, to send requests and collect log information as instructed by the path analysis unit 130. The server 300 is a Web server, for example, and processes requests upon receipt of them. Before requests are sent, the server 300 is set to output a detailed log. The analysis apparatus 100 sets the server 300 to output a detailed log about designated components using, for example, Java (registered trademark) bytecode injection. Alternatively, a process of setting an output of detailed log may previously be embedded in the server 300, so that the server 300 becomes able to collect a detailed log about designated components in response to a setting instruction from the analysis apparatus 100. In the following description, a process of "making a setting for an output of detailed log" indicates a process of setting the server 300 to be in such a state as to output a detailed log about designated components with the above-described procedure. In addition, in the analysis apparatus 100, the log information collecting unit 140 makes a setting for an output of detailed log about designated components, in response to an instruction from the path analysis unit 130. The server 300 having received requests processes the requests and generates an access log and a detailed log corresponding to the access log. The detailed log is generated about components designated in the setting. The log information collecting unit 140 obtains the access log and detailed log as log information from the server 300, to which the requests have been sent, and generates the first log information 212 and second log information 213.

After the path analysis unit 130 finishes the path analysis for the new source code 204, for example, the display control unit 150 performs display control via the video signal processing unit 104 so as to display the analysis result obtained by the path analysis unit 130 on the display 111. For example, the display control unit 150 generates display information indicating a changed caller-callee relationship between components on the basis of the difference path information 215, and displays the display information on the display 111.

The following describes a specific example. The analysis apparatus 100 performs a pre-analysis of the new source code 204, which is generated by partly modifying the old source code 201. With respect to the old source code 201, the corresponding old component definition information 202 and old path information 203 are already generated and stored in the storage unit 120.

Figure 4:
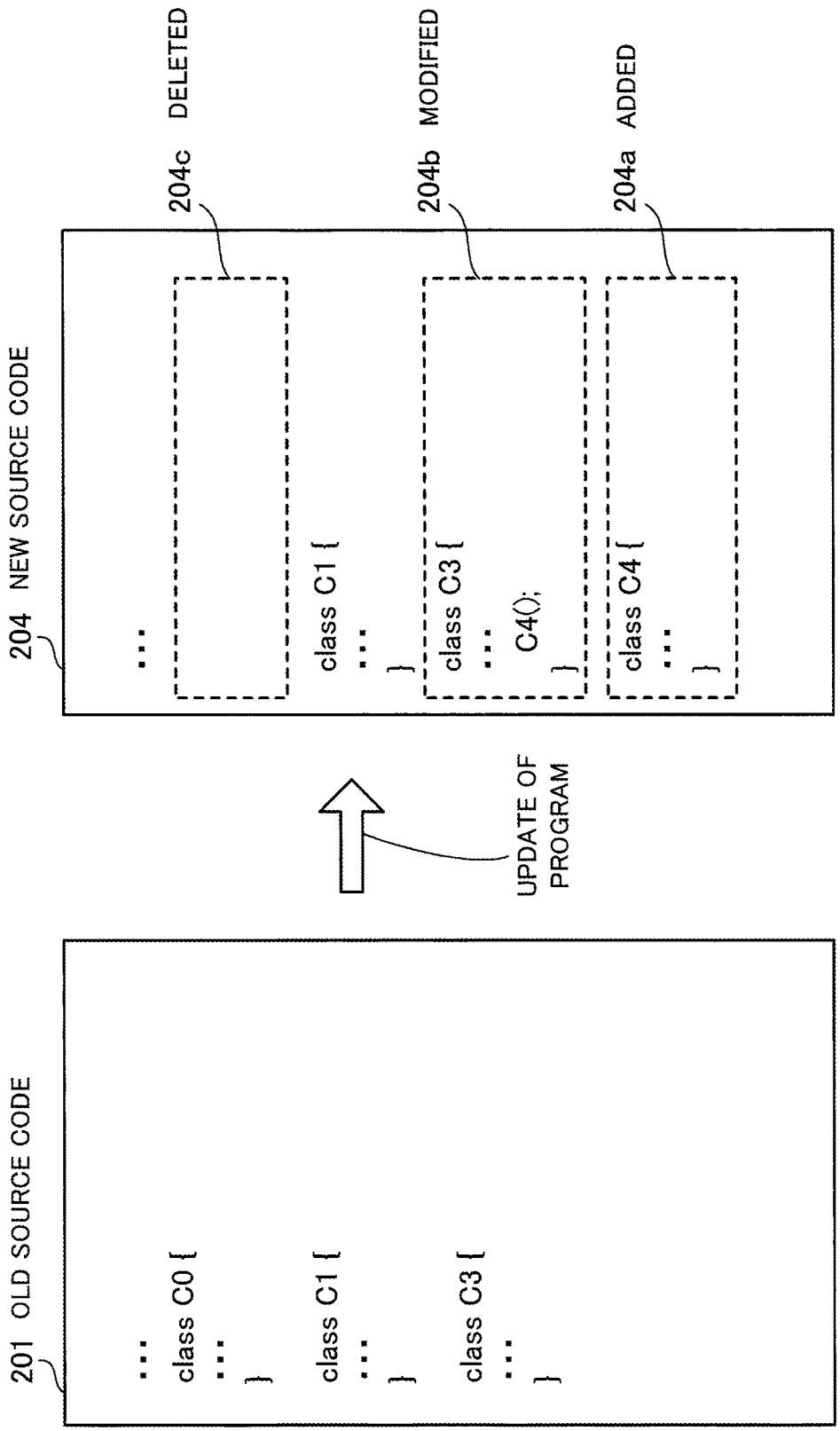
FIG. 4 illustrates an example of old source code and new source code.

FIG. 4 illustrates an example of old source code and new source code.

The new source code 204 is a program generated by partly updating the old source code 201. Referring to the example of FIG. 4, portions surrounded by dotted lines in the new source code 204 are updated portions from the old source code 201. In an added portion 204a, a class "class C4{ . . . }" is added. In a modified portion 204b, "C4" is added to "class C3{ . . . }" of the old source code 201. In a deleted portion 204c, "class C0{ . . . }" of the old source code 201 is deleted. In this connection, C0, C1, C3, and C4 are class names.

The path analysis unit 130 analyzes the new source code 204 to generate the new component definition information 205. For example, the path analysis unit 130 assigns classes, methods, blocks, and others of the new source code 204 to components under prescribed rules, such as the same hierarchical layers. In this connection, the new component definition information 205 based on the new source code 204 may be generated in advance before the path analysis unit 130 performs an analysis process.

Figure 5:
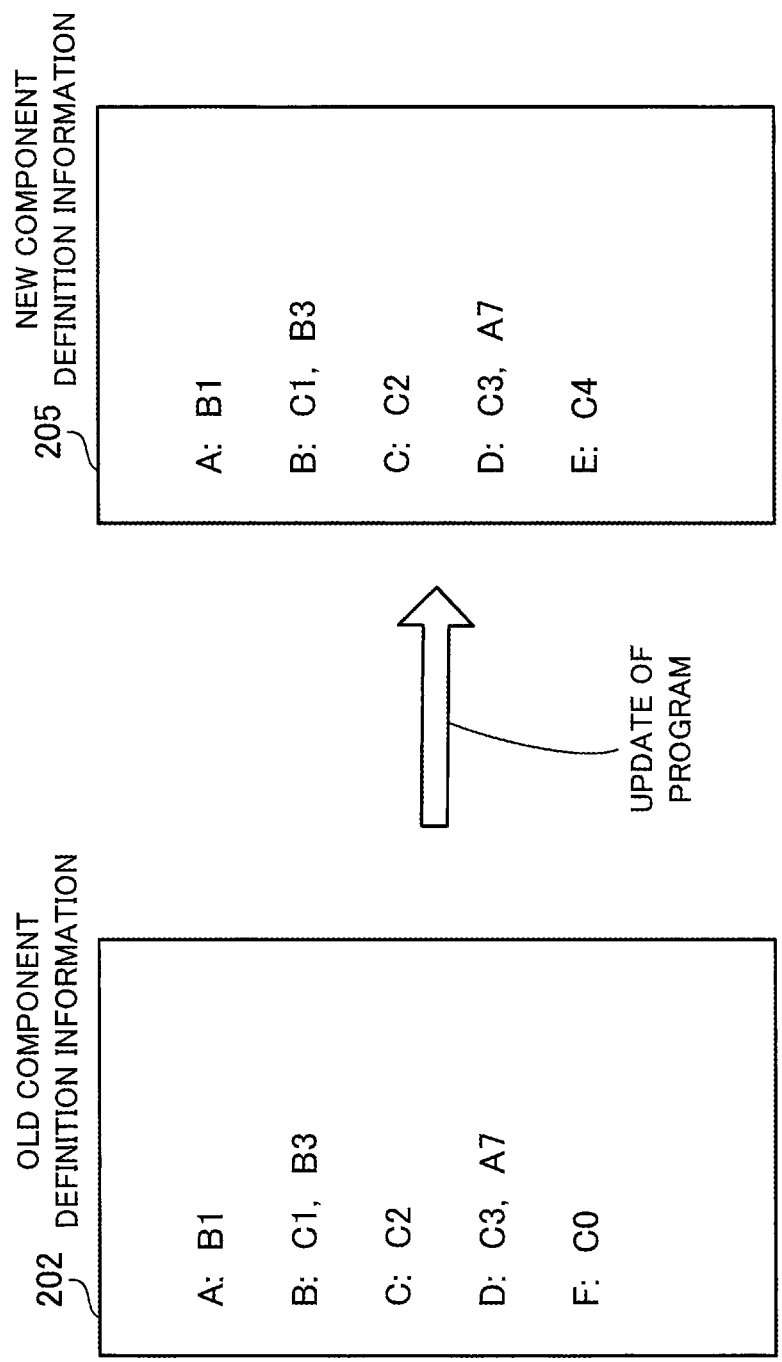
FIG. 5 illustrates an example of old component definition information and new component definition information.

FIG. 5 illustrates an example of old component definition information and new component definition information.

The old component definition information 202 associates each component of the old source code 201 with classes, methods, and blocks included in the component. Referring to the example of FIG. 5, the old component definition information 202 indicates that class C1 and block B3 are included in a component B, and class C2 is included in a component C.

The new component definition information 205 associates each new component of the new source code 204 with classes and others included in the new component. Referring to the example of FIG. 5, the new component definition information 205 is identical to the old component definition information 202 with respect to the components A, B, C, and D. In addition, the new component definition information 205 defines a new component E corresponding to class C4 newly added in the new source code 204. Also, the new component definition information 205 does not define a component F corresponding to class C0 of the old component definition information 202 because class C0 has been deleted in the new source code 204.

The path analysis unit 130 performs a process of specifying relevant functions related to the component E added in the new source code 204 on the basis of the new component definition information 205 and the old component definition information 202. In obtaining the first log information 212 in order to specify the relevant functions, only functions related to the component E needs to be specified. Therefore, components targeted for a detailed log are limited to the component E only. In addition, since it is not possible to specify which functions call the component E, all request patterns are sent to call all functions. The path analysis unit 130 instructs the log information collecting unit 140 to designate the component E as a component targeted for a detailed log, send all request patterns, and collect logs. The log information collecting unit 140 makes a setting for an output of detailed log about the component E, and sequentially sends the requests based on all request patterns stored in the request information 211 to the server 300. After sending all the request patterns, the log information collecting unit 140 collects an access log and detailed log from the server 300 having processed the requests, and generates the first log information 212. In this connection, the log information collecting unit 140 may be designed to collect the access log and detailed log from the server 300 each time it sends a request.

Figure 6:
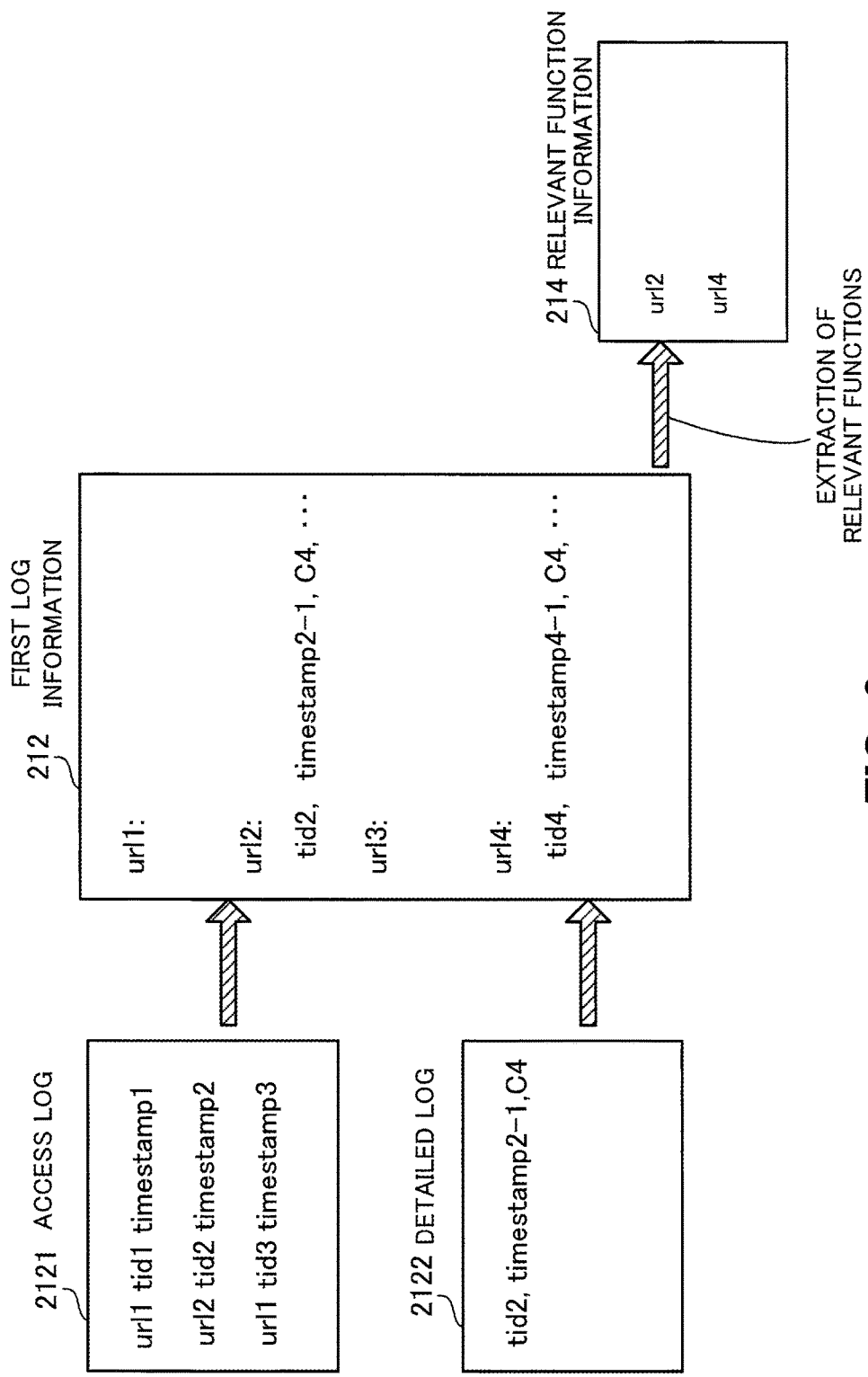
FIG. 6 illustrates an example of first log information and relevant function information.

FIG. 6 illustrates an example of first log information and relevant function information.

An access log 2121 is access information about functions called by the log information collecting unit 140 sending requests. The access log 2121 is collected by the server 300 upon receipt of the requests by the server 300. Referring to the example of FIG. 6, the access log 2121 includes the URL information (url) of a call destination, a transaction ID (tid), and a timestamp. A detailed log 2122 is information about a history of use of designated classes or methods by the server 300 having executed the functions. When a designated component is activated on the server 300 in response to a request, the detailed log 2122 is collected by the server 300. Referring to the example of FIG. 6, the detailed log 2122 includes a transaction ID (tid), a timestamp, and a called class name or method.

The log information collecting unit 140 generates the first log information 212 by arranging the entries of the detailed log for each function (url), on the basis of the access log 2121 and detailed log 2122, and stores the first log information 212 in the storage unit 120. In the first log information 212, the entries of the detailed log about the designated component E (class C4) are registered with respect to all functions called by executing all request patterns. A correspondence between a function and a component may be detected using a transaction id. Referring to the example of FIG. 6, the function "url1" does not have any entries of the detailed log about the component E (class C4). That is, the component E (class C4) is not used by the function "url1". In addition, the function "url2" has an entry of the detailed log, which means that the component E (class C4) has been used. That is, the function "url2" uses the component E (class 4). Similarly, the function "url3" does not use the component E, but the function "url4" uses the component E.

In this connection, the above example uses one component as a component targeted for obtaining a detailed log. The same applies for the case where a plurality of components are targeted for obtaining a detailed log. The log information collecting unit 140 designates all target components for obtaining a detailed log, sends all request patterns, and collects logs. In addition, the log information collecting unit 140 obtains the access log 2121 and detailed log 2122 separately. Alternatively, the server 300 may be designed to send information generated by adding the content of the access log 2121 to the detailed log 2122.

In this way, in collecting logs, the log information collecting unit 140 designates only components newly added in the new source code 204 as components targeted for an output of detailed log.

The path analysis unit 130 specifies URLs that have called the components targeted for obtaining a detailed log, as relevant functions on the basis of the first log information 212. Referring to the example of FIG. 6, the path analysis unit 130 extracts url2 and url4 as relevant functions, and registers these functions in the relevant function information 214. At this time point, only the relevant functions related to the added components have been specified. Therefore, subsequently, relevant functions related to modified components and delated components are specified.

Figure 7:
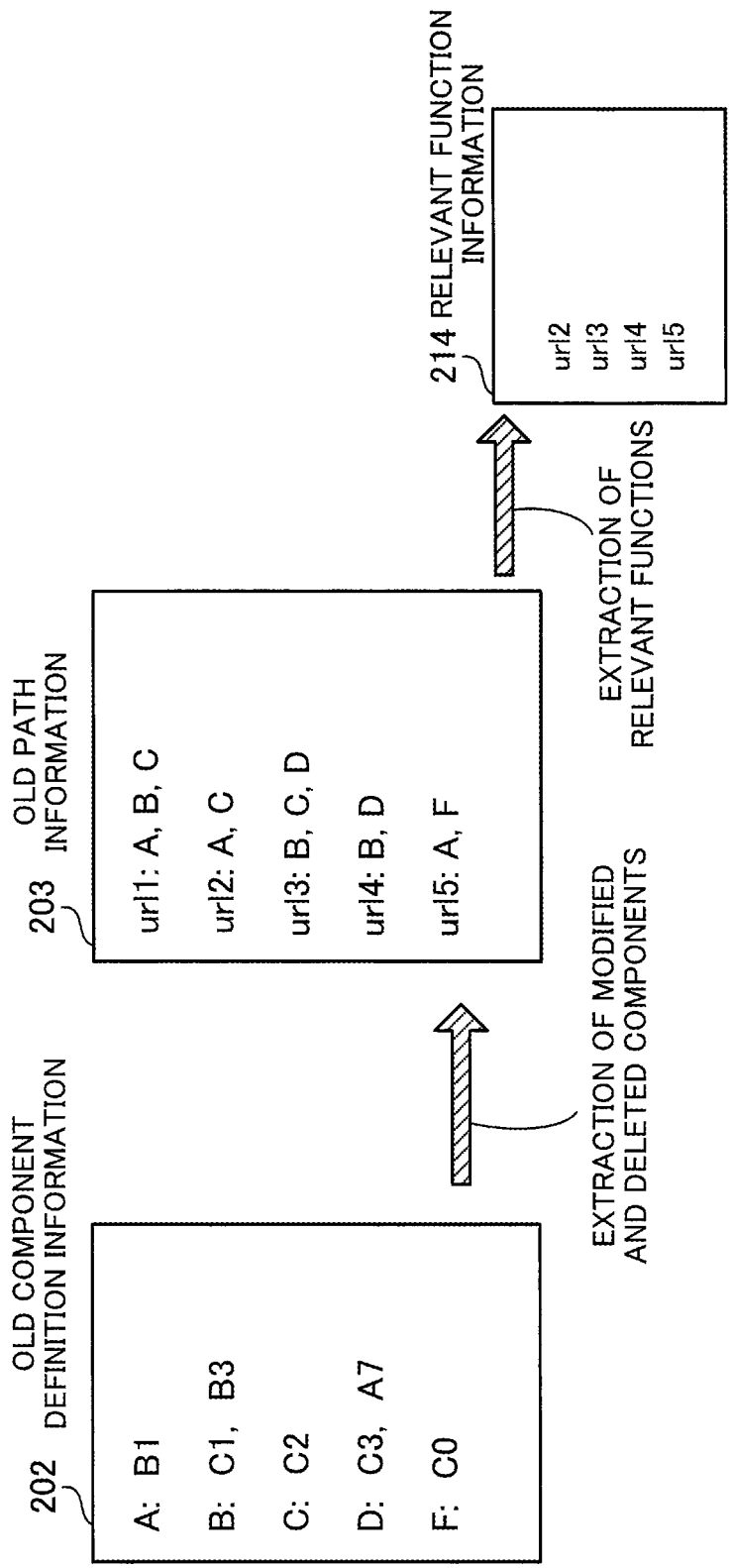
FIG. 7 illustrates an example of a process of specifying relevant functions related to modified and deleted components.

FIG. 7 illustrates an example of a process of specifying relevant functions related to modified and deleted components.

The path analysis unit 130 specifies relevant functions related to components modified and deleted in the update to the new source code 204, on the basis of the old component definition information 202 and old path information 203.

From a comparison between the old source code 201 and the new source code 204, the path analysis unit 130 detects that class C0 has been deleted and class C3 has been modified in the new source code 204. The modification and deletion of components do not involve changes in functions that use these components. Therefore, the path analysis unit 130 is able to specify their relevant functions on the basis of the old component definition information 202 and old path information 203. Referring to the example of FIG. 7, the path analysis unit 130 extracts the component "D" including the modified class "C3" as a modified component, and the component "F" including the deleted class "C0" as a deleted component. The path analysis unit 130 specifies functions corresponding to the extracted components D and F on the basis of the old path information 203. For example, the old path information 203 indicates that the functions "url3" and "url4" use the component "D". The path analysis unit 130 extracts url3 and url4 as relevant functions on the basis of the old path information 203. Similarly, the path analysis unit 130 extracts url5 as a relevant function related to the component F on the basis of the old path information 203. The path analysis unit 130 additionally registers the extracted relevant functions in the relevant function information 214. By doing so, the relevant functions specified for the added components and the relevant functions specified for the modified components and deleted components are registered in the relevant function information 214.

With the above procedure, the analysis apparatus 100 extracts the relevant functions related to the components included in the difference portions updated in the new source code 204. In a static analysis of the new source code 204, it is difficult to detect a combination of values to be applicable to parameters during operation, and to therefore specify relevant functions. The analysis apparatus 100 is able to specify relevant functions with the above procedure.

Then, the path analysis unit 130 performs a process of obtaining the second log information 213 with respect to the relevant functions based on the relevant function information 214. The second log information 213 is used for detecting components to be used by the relevant functions. The path analysis unit 130 instructs the log information collecting unit 140 to make a setting for an output of detailed log about all components, send request patterns only for the relevant functions, and collect logs with respect to the relevant functions. The log information collecting unit 140 makes a setting for an output of detailed log about all components, and extracts request patterns that call the relevant functions from the request information 211. The log information collecting unit 140 sends requests to the server 300 on the basis of the extracted request patterns. The server 300 having received the requests generates an entry of the detailed log each time the server 300 uses a component in processing the requests, according to the setting for the output of detailed log about all components. The log information collecting unit 140 obtains the detailed log and access log generated by the server 300. The log information collecting unit 140 sends requests based on all request patterns that call the relevant functions to the server 300, collects the access log and detailed log from the server 300, and generates the second log information 213. In the case where a plurality of servers are under management, the log information collecting unit 140 sets each of the servers for outputting a detailed log about all components, and then preforms transmission of requests and collection of logs. By sending request patterns only for relevant functions to the server, it is possible to reduce the processing time for collecting logs, compared with the case of sending all request patterns and collecting logs. Further, since request patterns only for relevant functions are sent, it is possible to further reduce the processing time in the case where the number of relevant functions is few.

Figure 8:
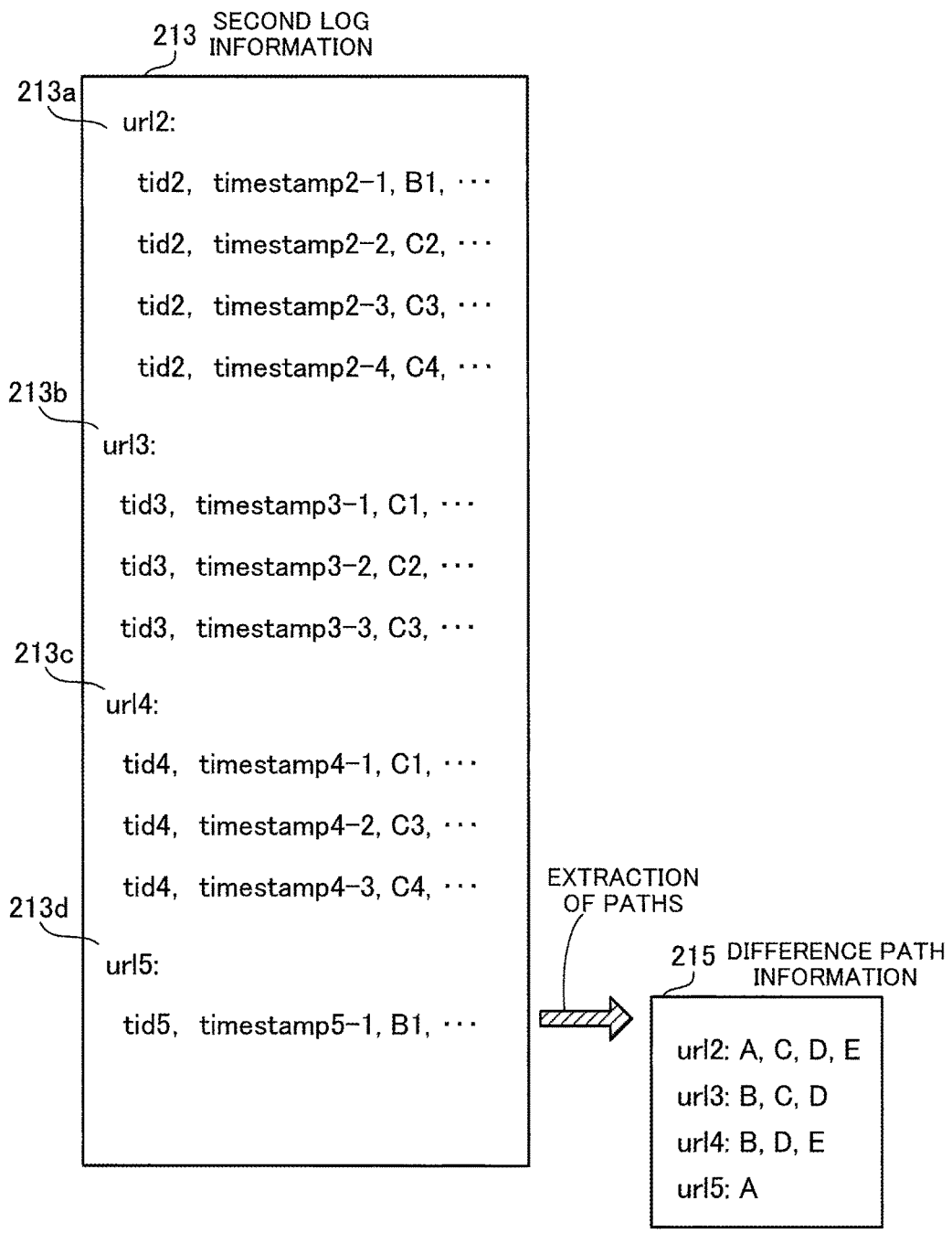
FIG. 8 illustrates an example of second log information and difference path information.

FIG. 8 illustrates an example of second log information and difference path information. FIG. 8 illustrates information with respect to the relevant functions url2, url3, url4, and url5 illustrated in FIG. 7, which is collected by the log information collecting unit 140.

The second log information 213 includes entries of a detailed log collected from the server 300 for each function. Referring to the example of FIG. 8, it is recognized that url2 (213a) has used block B1, class C2, class C3, and class C4, url3 (213b) has used class C1, class C2, and class C3, url4 (213c) has used class C1, class C3, and class C4, and url5 (213d) has used block B1.

The path analysis unit 130 specifies components corresponding to each function of the second log information 213 on the basis of the new component definition information 205, and registers them in the difference path information 215. Referring to the example of FIG. 8, the path analysis unit 130 registers a component A including the block B1, a component C including class C2, a component D including class C3, and a component E including class C4, as components that are used by url2. The path analysis unit 130 performs the same process for url3, url4, and url5 to generate the difference path information 215 corresponding to the relevant functions.

Figure 9:
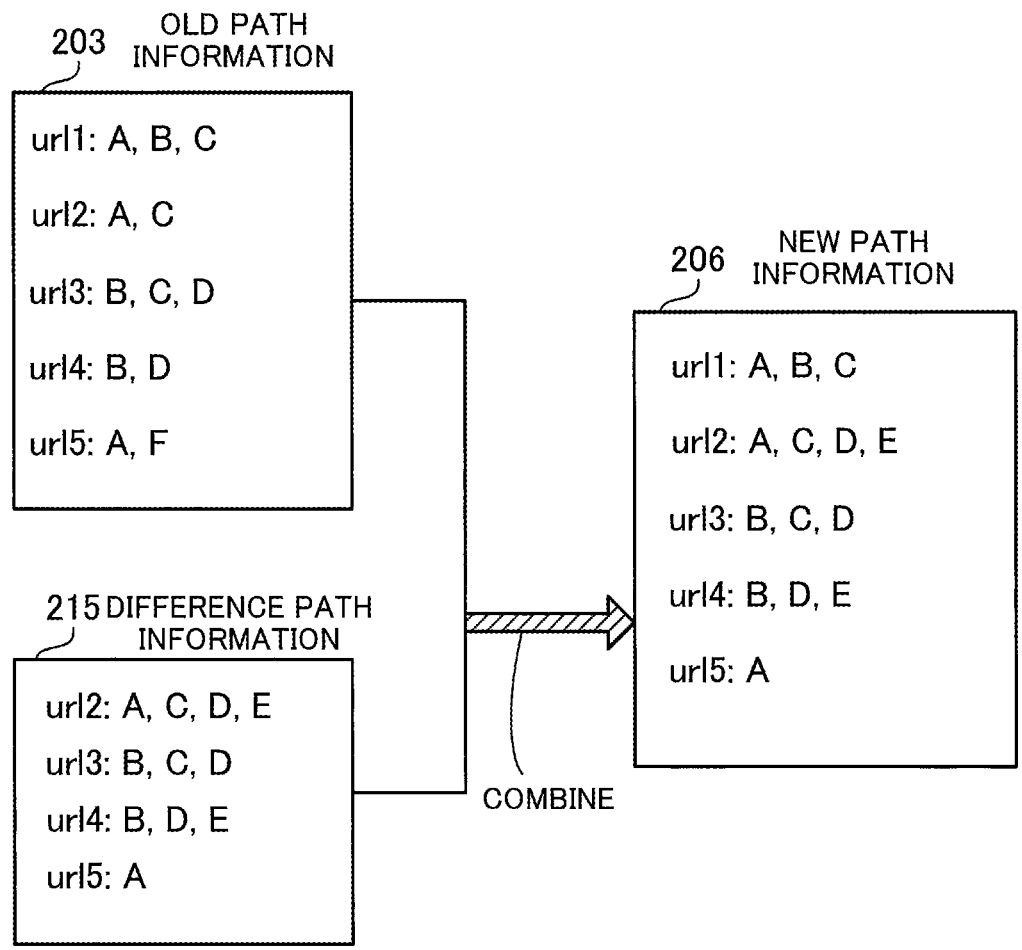
FIG. 9 illustrates an example of a process of generating new path information.

FIG. 9 illustrates an example of a process of generating new path information.

The path analysis unit 130 generates new path information 206 by combining the difference path information 215 and the old path information 203. Referring to the example of FIG. 9, the old path information 203 includes path information for the functions url1, url2, url3, url4, and url5. With regard to the functions url2, url3, url4, and url5 registered in the difference path information 215, out of these functions, new paths are detected.

Note that out of the functions corresponding to the new source code 204, the paths for functions other than the relevant functions specified by the path analysis unit 130 are the same as those described in the old path information 203. Therefore, the path analysis unit 130 selects to use the difference path information 215 with respect to the paths for the functions registered in the difference path information 215 among the functions corresponding to the new source code 204. In addition, the path analysis unit 130 selects to use the old path information 203 with respect to the paths for the functions that are not registered in the difference path information 215. The path analysis unit 130 combines the difference path information 215 and the old path information 203 in this way to thereby generate the new path information 206 that correspond to the new source code 204. The path analysis unit 130 stores the generated new path information 206 in the storage unit 120.

With the above procedure, the analysis apparatus 100 generates the new path information 206 corresponding to the new source code 204 and stores the new path information 206 in the storage unit 120. This makes it possible to use the new path information 206 for analyzing a problem if the problem occurs in the operation of the new source code 204.

As described above, the analysis apparatus 100 sends request patterns only for relevant functions corresponding to difference portions from the old source code 201 in the pre-analysis of the new source code 204, in order to generate the second log information 213 needed for a path analysis. Thereby, compared with the case of sending all request patterns corresponding to all functions and collecting logs, it is possible to reduce the processing time taken for the pre-analysis process. Especially, the analysis apparatus 100 collects logs only for the relevant functions. Therefore, as the number of relevant functions specified is fewer, the processing time taken for the pre-analysis process is further reduced.

The following describes how the analysis apparatus 100 performs a pre-analysis process, with reference to flowcharts.

Figure 10:
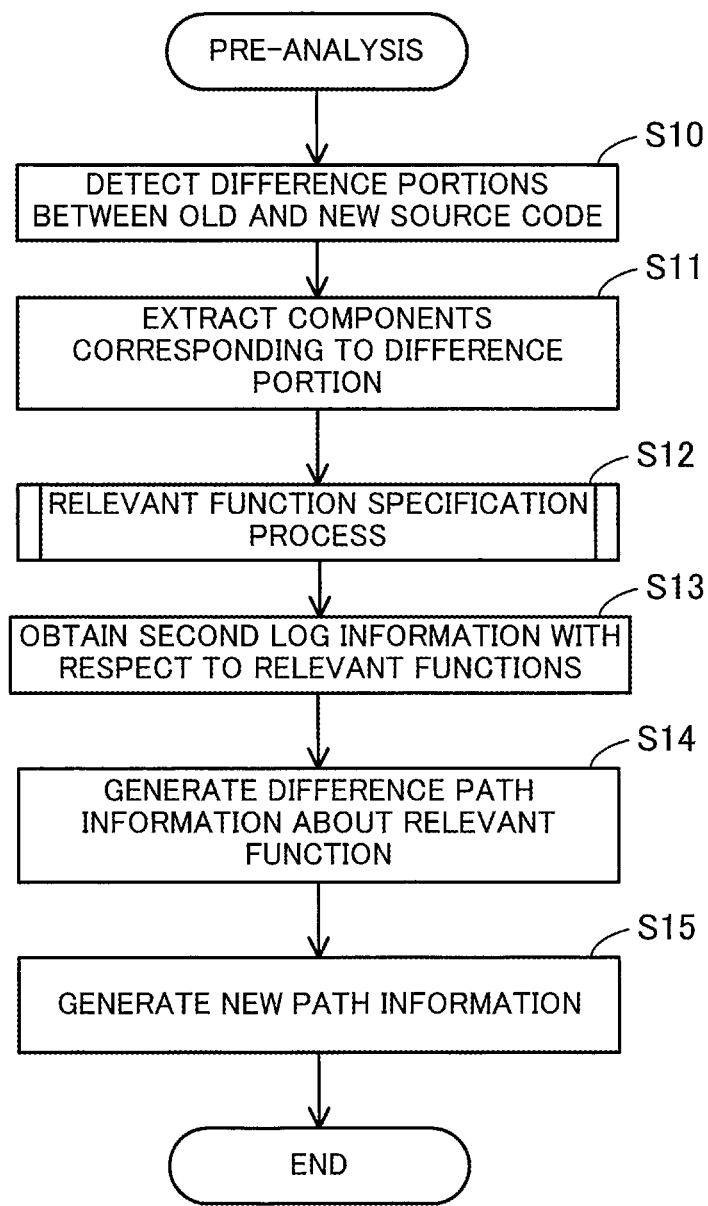
FIG. 10 is a flowchart illustrating how to perform a pre-analysis process.

FIG. 10 is a flowchart illustrating how to perform a pre-analysis process.

(Step S10) The path analysis unit 130 compares the new source code 204 with the old source code 201, stored in the storage unit 120, and detects difference portions of the new source code 204 from the old source code 201.

(Step S11) The path analysis unit 130 analyzes the difference portions to extract components corresponding to the difference portions. The path analysis unit 130 extracts added components, modified components, and deleted components, which have been added, modified, and deleted in the new source code 204, as the components corresponding to the difference portions.

(Step S12) The path analysis unit 130 performs a relevant function specification process of specifying relevant functions related to the added components, deleted components, and modified components. This relevant function specification process will be described in detail with reference to the flowchart of FIG. 11.

(Step S13) The path analysis unit 130 obtains the second log information 213 with respect to the specified relevant functions. The second log information 213 is about components that are used by executing the relevant functions. The path analysis unit 130 instructs the log information collecting unit 140 to make a setting for an output of detailed log about all components, send request patterns that call the relevant functions, and collect logs. In response to the instruction from the path analysis unit 130, the log information collecting unit 140 sets the server 300 to output a detailed log about all components, and sends requests corresponding to the relevant functions to the server 300. The log information collecting unit 140 collects the detailed log and access log generated by the server 300 processing the requests, from the server 300. The log information collecting unit 140 generates the second log information 213 associating the relevant functions with components used by the relevant functions, on the basis of the collected detailed log and access log, and stores the second log information 213 in the storage unit 120.

(Step S14) The path analysis unit 130 generates the difference path information 215 about the relevant functions on the basis of the second log information 213, and stores the difference path information 215 in the storage unit 120.

(Step S15) The path analysis unit 130 replaces the paths of the old path information 203 corresponding to the difference path information 215 with the paths of the difference path information 215 to thereby generate the new path information 206. The path analysis unit 130 stores the generated new path information 206 in the storage unit 120.

Figure 11:
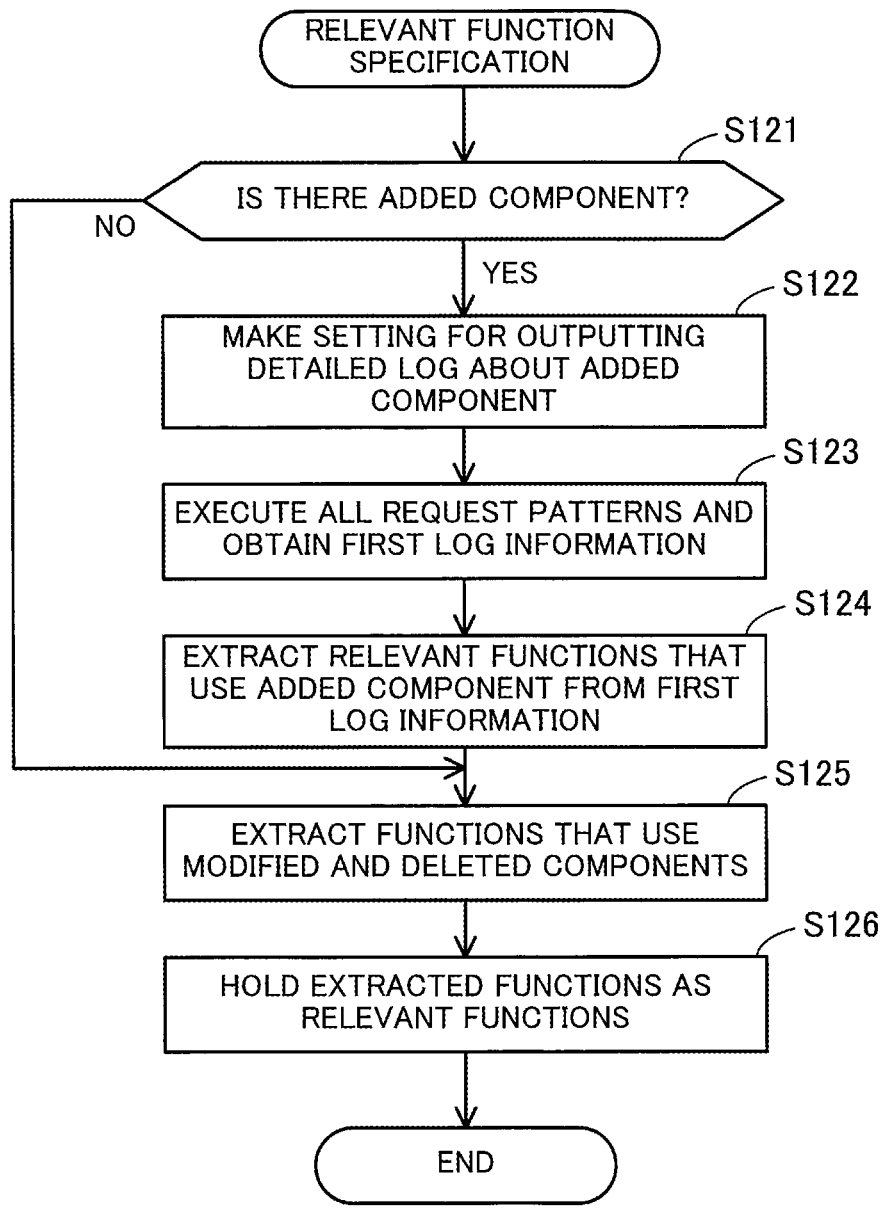
FIG. 11 is a flowchart illustrating how to perform a relevant function specification process.

FIG. 11 is a flowchart illustrating how to perform a relevant function specification process.

This process starts when difference components corresponding to difference portions of the new source code 204 from the old source code 201 are extracted.

(Step S121) The path analysis unit 130 determines whether the extracted difference components include any added components. If an added component exists, the process proceeds to step S122; otherwise, the process proceeds to step S125.

(Step S122) The path analysis unit 130 instructs the log information collecting unit 140 to make a setting for an output of detailed log only about the added components.

(Step S123) The path analysis unit 130 instructs the log information collecting unit 140 to send all request patterns and collect logs under the setting instructed at step S122. The log information collecting unit 140 makes a setting for the output of detailed log only about the added components, and sequentially sends the requests based on all request patterns to the server 300. The log information collecting unit 140 obtains a detailed log and access log generated by the server 300 having executed functions in response to the requests, and then generates the first log information 212.

(Step S124) The path analysis unit 130 extracts relevant functions that use the added components from the first log information 212.

(Step S125) The path analysis unit 130 extracts functions that use modified components and deleted components on the basis of the old component definition information 202.

(Step S126) The path analysis unit 130 registers functions corresponding to the modified components and deleted components, as well as the relevant functions corresponding to the added components, as relevant functions.

With the above procedure, relevant functions related to difference components including added, modified, and deleted components in the new source code 204 are extracted. Since the relevant functions are specified as described above, the analysis apparatus 100 is able to collect logs only for the relevant functions and generate the new path information 206 in the pre-analysis of the new source code 204. Therefore, as compared with the case of collecting logs using all request patterns corresponding to all functions for the new source code 204, the analysis apparatus 100 is able to reduce the processing time taken for the pre-analysis.

The analysis apparatus 100 is able to provide users with the generated path information. Also, the analysis apparatus 100 is able to supply the old path information 203, difference path information 215, and new path information 206 stored in the storage unit 120 in response to a request from an external device. In addition, for example, the analysis apparatus 100 is able to display a component caller-callee relationship based on the path information on a display screen for users' confirmation.

FIG. 12 illustrates an example of a display screen displaying component caller-callee relationship tables.

A display screen 610 displays a pre-update component caller-callee relationship table 611 and a post-update component caller-callee relationship table 612. Referring to the example of FIG. 12, "function 1" and "function 2" are relevant functions that use difference components detected in the new source code 204. In the fields corresponding to each function, "1" represents a target component, "( )" on its left side represents a caller component that calls the target component, and "( )" on its right side represents a callee component that is called by the target component. For example, "(B)1(C)" in the pre-update component caller-callee relationship table 611 indicates that the component B calls the component A and the component A calls the component C, in the execution of "function 1" responsive to a request.

The pre-update component caller-callee relationship table 611 is generated by the display control unit 150 on the basis of the difference path information 215 and old path information 203. The display control unit 150 extracts paths for functions corresponding to the difference path information 215 from the old path information 203, and generates a correspondence table between functions and components. In this connection, for example, the caller-callee relationship is detected by the display control unit 150 on the basis of the second log information 213. In addition, the path analysis unit 130 may be designed to extract the caller-callee relationship at the time of extracting paths.

The post-update component caller-callee relationship table 612 is generated by the display control unit 150 on the basis of the difference path information 215. The display control unit 150 generates a correspondence table between functions and paths registered in the difference path information 215.

By displaying such path information that is changed before and after a program update on a display screen, it is possible for a user to easily confirm paths that have been changed by the update. For example, the user is able to confirm from the display screen 610 that the component "D" added to the "function 2" is called by the component "E". For example, the user is able to easily detect an unwanted call of a function to a component by comparing the pre-update component caller-callee relationship table 611 with the post-update component caller-callee relationship table 612.

In this connection, the display control unit 150 may be designed to highlight different portions of the post-update component caller-callee relationship table 612 from the pre-update component caller-callee relationship table 611. This allows the user to confirm these different portions more easily.

In addition, the display control unit 150 may be designed to provide the component caller-callee relationship in a relationship diagram.

Figure 13:
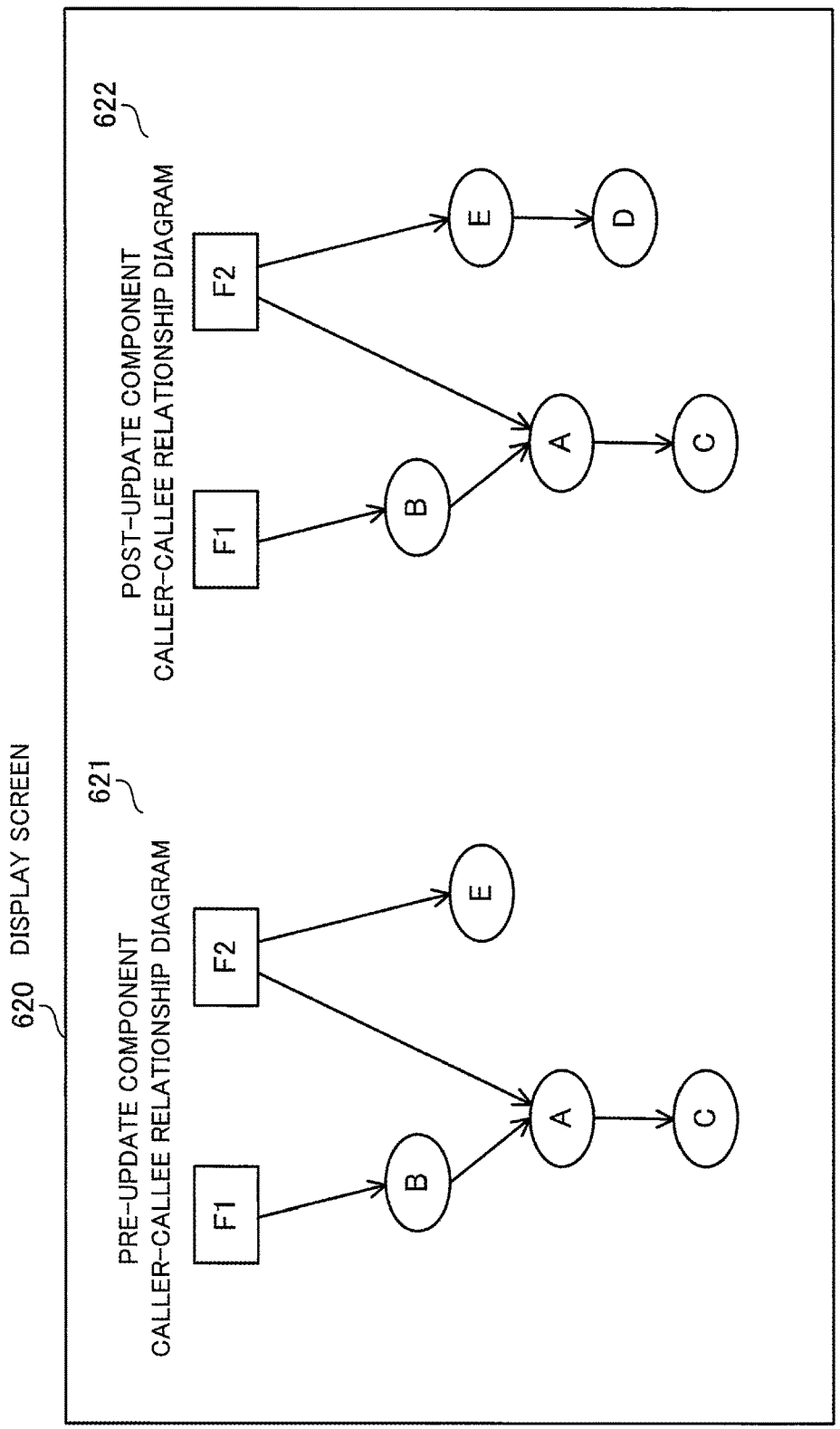
FIG. 13 illustrates an example of a display screen displaying component caller-callee relationship diagrams.

FIG. 13 illustrates an example of a display screen displaying component caller-callee relationship diagrams. The display screen of FIG. 13 displays the component caller-callee relationships illustrated in FIG. 12, in a diagram form.

Component caller-callee relationship diagrams displayed on the display screen 620 include a pre-update component caller-callee relationship diagram 621 and a post-update component caller-callee relationship diagram 622. On the display screen 620 of FIG. 13, "F1" represents "function 1" of FIG. 12, "F2" represents "function 2", and "A", "B", "C", "D", and "E" represent components. Representing the component caller-callee relationship in a relationship diagram enables users to confirm the component caller-callee relationship of the new source code 204 more easily.

By the way, the analysis apparatus 100 may be designed to give a version number to the new path information 206 at the time of generating the new path information 206. For example, the path analysis unit 130 obtains the version number of the new source code 204 analyzed, and stores the obtained version number in association with the version number given to the new path information 206 in the storage unit 120. This makes it possible to select and use path information corresponding to a target application in order to find what causes a problem in the application when the problem is detected during operation.

In a static analysis of source code, it is not possible to detect a component caller-callee relationship for a request being sent. However, as described above, the path information generated by the analysis apparatus 100 enables a user to confirm such a component caller-callee relationship for a request being sent. For example, at the time of debugging an application, the user compares the old path information 203 with the new path information 206 to detect a change in the component caller-callee relationship with respect to the same request pattern. This makes the debugging easy. Further, while the application operates, the path information may be used to narrow down a cause of a delay occurring in the server 300. For example, in the case where a delay occurs only with a certain request pattern in the server 300, it is possible to identify a group of components that have caused the delay. This reduces the time taken to detect the cause of the delay.

In addition, the above-described analysis apparatus 100 collects logs only with respect to relevant functions and generates new path information 206. If such a limitation of functions for which logs are collected does not reduce the processing time taken for a pre-analysis, logs may be collected with respect to all functions as generally done. For example, as the number of specified relevant functions increases, the number of request patterns to be used for obtaining the second log information 213 increases and therefore the time taken for obtaining the second log information 213 increases. In addition, the path analysis unit 130 generates the difference path information 215 based on the second log information 213 and then generates the new path information 206 by combining the difference path information 215 with the old path information 203. With an increase in the number of relevant functions, the time taken to combine the difference path information 215 with the old path information 203 may increase. Therefore, the processing time calculated by adding the time taken to obtain the second log information 213 only with respect to relevant functions and the time taken to generate the new path information 206 may not be shorter than the processing time taken by a conventional technique. The conventional technique is to obtain a detailed log about all components with respect to all request patterns corresponding to all functions and generate new path information. It may be configured so that, before starting to obtain the second log information 213, the path analysis unit 130 calculates the processing time H1 expected for the case of obtaining the second log information 213 and the processing time H2 expected for the conventional technique and to determine either one that achieves a shorter processing time.

The processing time H1 expected for the case of using the second log information 213 is expressed as the following equation:

$H1$=Time to collect logs with respect to relevant functions+Time to generate difference path information and combine difference path information with old path information The processing time H2 expected for the conventional technique is expressed as the following equation:

$H2$=Time to collect logs using all request patterns+ Time to generate new path information For example, as the log collection time to collect logs, the time taken to output a detailed log about all components is measured for each function in advance. Alternatively, for example, the processing time taken to output a detailed log about each component may be defined by a simulation or the like, and the processing time for each function may be calculated on the basis of the defined processing times. The processing time for each component may be adjusted according to the granularity (for each class, method, or the like). The analysis apparatus 100 employs either way to calculate the log collection time for each function and store the calculated log collection times in the storage unit 120 in advance. In addition, the processing time taken to generate the difference path information 215 and the processing time taken to combine the difference path information 215 with the old path information 203 are defined in advance. The time taken to generate new path information from the logs with respect to all request patterns is defined as well. These processing times may be measured and defined in advance, or may be detected by a simulation. Alternatively, the time taken to generate path information for a single function may be defined in advance, and the processing time based on the number of functions may be calculated.

The path analysis unit 130 calculates the processing time H1 and the processing time H2 with the above calculation equations before the second log information 213 is generated. The path analysis unit 130 adds up the processing times of relevant functions and further adds the processing time taken to generate and combine difference path information, thereby calculating the processing time H1. In addition, the path analysis unit 130 adds up the processing times of all functions and further adds the processing time taken to generate new path information, thereby calculating the processing time H2. The path analysis unit 130 compares the calculated processing time H1 with the calculated processing time H2 to determine which process to employ. If H1<H2, the path analysis unit 130 collects logs with respect to relevant functions only and generates path information. If H1≥H2, the path analysis unit 130 collects logs with respect to all functions and generates path information.

The analysis apparatus 100 calculates the time taken to collect logs, determines whether the log collection only with respect to relevant functions achieves a reduction in processing time, and only when a time reduction is expected, collects logs with respect to relevant functions only. This approach reduces the processing time taken for the pre-analysis more efficiently.

In this connection, the information processing of the first embodiment may be implemented by the analysis apparatus 10 running a program. The information processing of the second embodiment may be implemented by the analysis apparatus 100 running a program.

A program may be recorded on a computer-readable recording medium (for example, the recording medium 113). As such a recording medium, a magnetic disk, an optical disc, a magneto-optical disk, a semiconductor memory, or the like may be used. Magnetic disks include FDs and HDDs. Optical discs include CDs, CD-Rs (Recordable), CD-RWs (Rewritable), DVD, DVD-Rs, and DVD-RWs. The program may be recorded on portable recording media that are then distributed. In this case, the program may be copied from a portable recording medium to another recording medium, such as an HDD (for example, HDD 103).

According to one aspect, it is possible to reduce the processing time for analyzing a program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing a computer program that causes a computer to perform a procedure comprising:
specifying a difference component between a first program and a second program by comparing a first program code and a second program code, the first program being made from the first program code and including a first plurality of components, the second program being made from the second program code and including a second plurality of components;
sending program execution requests to an execution apparatus to execute the second program, while explicitly designating the difference component as a component to be monitored by the execution apparatus and instructing the execution apparatus to record a first log that describes which of the execution requests causes execution of the designated difference component;
obtaining the first log from the execution apparatus;
specifying a relevant program execution request among the program execution requests, when the obtained first log indicates that the relevant program execution request has caused the execution apparatus to execute the difference component;
sending the specified relevant program execution request to the execution apparatus to execute the second program, while instructing the execution apparatus to monitor the second plurality of components and record a second log about execution of the second plurality of components;
obtaining the second log from the execution apparatus, the second log indicating which of the second plurality of components the execution apparatus has executed in response to the relevant program execution request; and
generating, based on the obtained second log, path information that describes a collection of components that are used by the second program in response to the relevant program execution request.

2. The non-transitory computer-readable recording medium according to claim 1, wherein for the obtaining the first log, the first plurality of components to be monitored are limited to the difference component, and the program execution requests are sent to the execution apparatus.

3. The non-transitory computer-readable recording medium according to claim 1, wherein for the obtaining the second log, all of the second plurality of components are designated as components to be monitored, and only the relevant program execution request is sent to the execution apparatus.

4. The non-transitory computer-readable recording medium according to claim 1, wherein the procedure further includes generating second path information based on the path information and first path information, the second path information indicating a relationship between the program execution requests and the second plurality of components, the first path information indicating a relationship between the program execution requests and the first plurality components.

5. An analysis apparatus comprising:
a memory configured to store therein a first program code and a second program code; and
a processor configured to perform a procedure including:
specifying a difference component between a first program and a second program by comparing the first program code with the second program code, the first program being made from the first program code and including a first plurality of components, the second program being made from the second program code and including a second plurality of components;
sending program execution requests to an execution apparatus to execute the second program, while explicitly designating the difference component as a component to be monitored by the execution apparatus and instructing the execution apparatus to record a first log that describes which of the execution requests causes execution of the designated difference component;

obtaining the first log the first log from the execution apparatus;

specifying a relevant program execution request among the program execution requests, when the obtained first log indicates that the relevant program execution request has caused the execution apparatus to execute the difference component;

sending the specified relevant program execution request to the execution apparatus to execute the second program, while instructing the execution apparatus to monitor the second plurality of components and record a second log about execution of the second plurality of components;

obtaining the second log from the execution apparatus, the second log indicating which of the second plurality of components the execution apparatus has executed in response to the relevant program execution request; and generating, based on the obtained second log, path information that describes a collection of components that are used by the second program in response to the relevant program execution request.

6. An analysis method comprising:

specifying a difference component between a first program and a second program by comparing, by a processor, a first program code and a second program code, the first program being made from the first program code and including a first plurality of components, the second program being made from the second program code and including a second plurality of components;

sending, by the processor, program execution requests to an execution apparatus to execute the second program, while explicitly designating the difference component as a component to be monitored by the execution apparatus and instructing the execution apparatus to record a first log that describes which of the execution requests causes execution of the designated difference component;

obtaining the first log the first log from the execution apparatus;

specifying a relevant program execution request among the program execution requests, when the obtained first log indicates that the relevant program execution request has caused the execution apparatus to execute the difference component;

sending, by the processor, the specified relevant program execution request to the execution apparatus to execute the second program, while instructing the execution apparatus to monitor the second plurality of components and record a second log about execution of the second plurality of components;

obtaining the second log from the execution apparatus, the second log indicating which of the second plurality of components the execution apparatus has executed in response to the relevant program execution request; and generating, based on the obtained second log, path information that describes a collection of components that are used by the second program in response to the relevant program execution request.

* * * * *